United States Patent
Uka et al.

(10) Patent No.: US 10,304,634 B2
(45) Date of Patent: May 28, 2019

(54) ELECTROLYTIC CAPACITOR

(71) Applicant: Panasonic Intellectual Property Management Co., Ltd., Osaka (JP)

(72) Inventors: Youichirou Uka, Hyogo (JP); Katsuya Miyahara, Osaka (JP); Hiroshi Kojima, Aichi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/790,145

(22) Filed: Oct. 23, 2017

(65) Prior Publication Data

US 2018/0047512 A1 Feb. 15, 2018

Related U.S. Application Data

(63) Continuation of application No. PCT/JP2016/001807, filed on Mar. 29, 2016.

(30) Foreign Application Priority Data

Apr. 28, 2015 (JP) .................................. 2015-092084

(51) Int. Cl.
 *H01G 9/028* (2006.01)
 *H01G 9/15* (2006.01)
 (Continued)

(52) U.S. Cl.
 CPC ........... *H01G 9/028* (2013.01); *H01G 9/0032* (2013.01); *H01G 9/042* (2013.01); *H01G 9/052* (2013.01);
 (Continued)

(58) Field of Classification Search
 CPC ...... H01G 9/028; H01G 9/0032; H01G 9/042; H01G 9/052; H01G 9/07; H01G 9/15; H01G 11/56
 See application file for complete search history.

(56) References Cited

U.S. PATENT DOCUMENTS 7,742,281 B2 * 6/2010 Goto .................... H01G 9/0036
 29/25.03
2003/0142462 A1 * 7/2003 Kuwahara ................ C08K 5/42
 361/311

(Continued)

FOREIGN PATENT DOCUMENTS

| CN | 103518244 A | 1/2014 |
| JP | 2010-087401 | 4/2010 |
| WO | 2012/153790 | 11/2012 |

OTHER PUBLICATIONS

International Search Report of PCT application No. PCT/JP2016/001807 dated Jun. 21, 2016.

(Continued)

*Primary Examiner* — Dion Ferguson
(74) *Attorney, Agent, or Firm* — McDermott Will & Emery LLP

(57) ABSTRACT

An electrolytic capacitor includes an anode body, a dielectric layer formed on the anode body, a first conductive polymer layer covering at least a part of the dielectric layer, and a second conductive polymer layer covering at least a part of the first conductive polymer layer. The first conductive polymer layer includes a first conductive polymer. The second conductive polymer layer includes a second conductive polymer. The first conductive polymer layer and the second conductive polymer layer each further include a first polymer dopant having a sulfonation degree of $S_1$. At least one of the first conductive polymer layer and the second conductive polymer layer further includes a second polymer (Continued)

dopant having a sulfonation degree of $S_2$. The sulfonation degree of $S_1$ and the sulfonation degree of $S_2$ satisfy a relation of $S_1<S_2$.

28 Claims, 1 Drawing Sheet

(51) Int. Cl.
 *H01G 9/00* (2006.01)
 *H01G 9/042* (2006.01)
 *H01G 9/052* (2006.01)
 *H01G 9/07* (2006.01)
 *H01G 11/56* (2013.01)
(52) U.S. Cl.
 CPC ................ *H01G 9/07* (2013.01); *H01G 9/15* (2013.01); *H01G 11/56* (2013.01)

(56) References Cited

U.S. PATENT DOCUMENTS

| | | | | |
|---|---|---|---|---|
| 2006/0223976 A1* | 10/2006 | Tozawa | ................ | C08K 5/42 528/373 |
| 2008/0007893 A1* | 1/2008 | Takagi | ................ | H01G 9/0036 361/525 |
| 2008/0158783 A1* | 7/2008 | Goto | ................ | H01G 9/0036 361/525 |
| 2010/0053848 A1* | 3/2010 | Kikuchi | ................ | H01G 9/028 361/523 |
| 2010/0284129 A1* | 11/2010 | Sugihara | ................ | C08L 61/06 361/525 |
| 2011/0019340 A1* | 1/2011 | Nobuta | ................ | C08K 5/053 361/525 |
| 2011/0171366 A1 | 7/2011 | Ning et al. | | |
| 2012/0044615 A1* | 2/2012 | Takahashi | ................ | H01G 9/025 361/528 |
| 2012/0127634 A1* | 5/2012 | Sugihara | ................ | H01G 9/0036 361/525 |
| 2012/0212880 A1* | 8/2012 | Ishimaru | ................ | H01G 9/028 361/530 |
| 2012/0300370 A1* | 11/2012 | Chacko | ................ | H01G 9/028 361/528 |
| 2014/0078645 A1 | 3/2014 | Sugihara et al. | | |
| 2014/0091263 A1* | 4/2014 | Akikaze | ................ | C08F 28/02 252/500 |
| 2016/0163466 A1* | 6/2016 | Naito | ................ | H01G 9/15 361/525 |
| 2018/0047513 A1* | 2/2018 | Uka | ................ | H01G 9/028 |

OTHER PUBLICATIONS

English Translation of Chinese Search Report dated Sep. 5, 2018 for the related Chinese Patent Application No. 201680024007.4.

* cited by examiner

ELECTROLYTIC CAPACITOR

RELATED APPLICATIONS

This application is a continuation of the PCT International Application No. PCT/JP2016/001807, filed on Mar. 29, 2016, which claims the benefit of foreign priority of Japanese patent application No. 2015-092084, filed on Apr. 28, 2015, the contents all of which are incorporated herein by reference.

BACKGROUND

1. Technical Field

The present disclosure relates to an electrolytic capacitor having a conductive polymer layer.

2. Description of the Related Art

As small-sized, large capacitance, and low ESR (equivalent series resistance) capacitors, promising candidates are electrolytic capacitors including an anode body on which a dielectric layer is formed and a conductive polymer layer formed so as to cover at least a part of the dielectric layer. The conductive polymer layer includes a π-conjugated polymer and a dopant. With use of the dopant, high conductivity is imparted to the π-conjugated polymer.

As the dopant, a polymer dopant having a sulfonate group, such as polystyrene sulfonic acid is sometimes used (refer to Unexamined Japanese Patent Publication No. 2010-87401).

SUMMARY

An electrolytic capacitor in a first aspect of the present disclosure includes an anode body, a dielectric layer formed on the anode body, a first conductive polymer layer covering at least a part of the dielectric layer, and a second conductive polymer layer covering at least a part of the first conductive polymer layer. The first conductive polymer layer includes a first conductive polymer. The second conductive polymer layer includes a second conductive polymer. The first conductive polymer layer and the second conductive polymer layer each further include a first polymer dopant having a sulfonation degree of $S_1$. At least one of the first conductive polymer layer and the second conductive polymer layer further includes a second polymer dopant having a sulfonation degree of $S_2$. The sulfonation degree of $S_1$ and the sulfonation degree of $S_2$ satisfy a relation of $S_1<S_2$.

An electrolytic capacitor in a second aspect of the present disclosure includes an anode body, a dielectric layer formed on the anode body, a first conductive polymer layer covering at least a part of the dielectric layer, and a second conductive polymer layer covering at least a part of the first conductive polymer layer. The first conductive polymer layer includes a first conductive polymer. The second conductive polymer layer includes a second conductive polymer. The first conductive polymer layer and the second conductive polymer layer each further include a first polymer dopant having a sulfonation degree of $S_1$. The first conductive polymer layer and the second conductive polymer layer each further include a second polymer dopant having a sulfonation degree of $S_2$. The sulfonation degree of $S_1$ and the sulfonation degree of $S_2$ satisfy a relation of $S_1<S_2$. A composition of the second polymer dopant included in the first conductive polymer layer is different from a composition of the second polymer dopant included in the second conductive polymer layer.

According to the present disclosure, it is possible to improve moisture resistance in an electrolytic capacitor.

DETAILED DESCRIPTION OF EMBODIMENT

Figure 1:
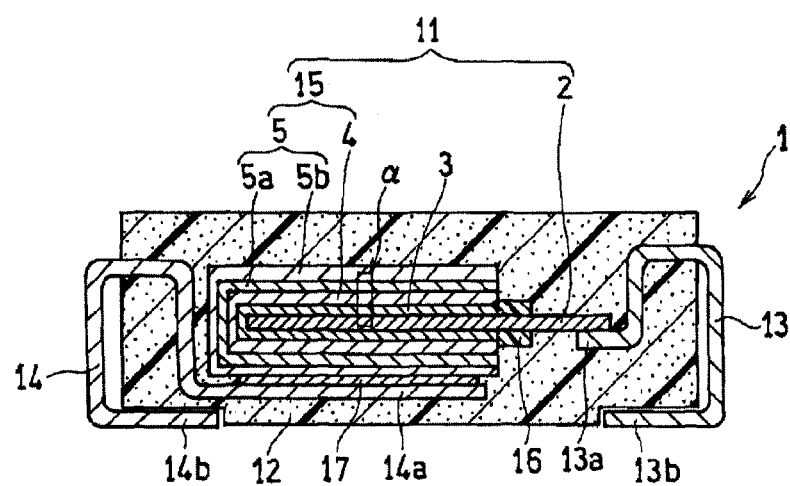
FIG. 1 is a schematic sectional view illustrating an electrolytic capacitor according to one exemplary embodiment of the present disclosure.

When a dopant described in Unexamined Japanese Patent Publication No. 2010-87401 is used, moisture resistance of an electrolytic capacitor is insufficient.

In view of the problem, the present disclosure provides a technique of improving moisture resistance in an electrolytic capacitor having a conductive polymer layer.

[Electrolytic Capacitor]

An electrolytic capacitor according to an exemplary embodiment of the present disclosure includes an anode body, a dielectric layer formed on the anode body, a first conductive polymer layer covering at least a part of the dielectric layer, and a second conductive polymer layer covering at least a part of the first conductive polymer layer. The first conductive polymer layer includes a first conductive polymer. The second conductive polymer layer includes a second conductive polymer. The first conductive polymer layer and the second conductive polymer layer each further include a first polymer dopant having a sulfonation degree of $S_1$. At least one of the first conductive polymer layer and the second conductive polymer layer further includes a second polymer dopant having a sulfonation degree of $S_2$. The sulfonation degree of $S_1$ and the sulfonation degree of $S_2$ satisfy a relation of $S_1<S_2$. When the first conductive polymer layer and the second conductive polymer layer each include the second polymer dopant, a composition of the second polymer dopant included in the first conductive polymer layer is different from a composition of the second polymer dopant included in the second conductive polymer layer.

The first conductive polymer layer and the second conductive polymer layer each include a first polymer dopant having a relatively low sulfonation degree, so that moisture resistance of both layers can be enhanced. However, when the sulfonation degree becomes low, dispersibility of the dopant is likely to be low. Consequently, it is hard to form a conductive polymer layer in which distribution of the dopant (or the dopant and the conductive polymer) in the conductive polymer layer is uniform, and therefore the ESR is difficult to be reduced. Further, since a carrier concentration of the conductive polymer layer is lowered, the ESR is also difficult to be reduced because of a decrease in electrical conductivity of the conductive polymer layer. In the present exemplary embodiment, since at least one of the first conductive polymer layer and the second conductive polymer layer includes the second polymer dopant having a relatively high sulfonation degree, film quality becomes uniform and the carrier concentration can be enhanced. Thus, conductivity of the conductive polymer layer can be enhanced and the ESR can also be reduced. Further, the first conductive polymer layer and the second conductive polymer layer each include the first polymer dopant, so that adhesion between both layers is enhanced and interface resistance can be kept low. From this point, the ESR can also be reduced. Characteristics required of the first conductive polymer layer are different from those of the second conductive polymer layer. Thus, by making the composition of the second polymer dopant different from that of the first polymer dopant while ensuring the adhesion between both layers with the first polymer dopant, desired characteristics can be imparted to each of the first conductive polymer layer and the second conductive polymer layer.

Figure 2:
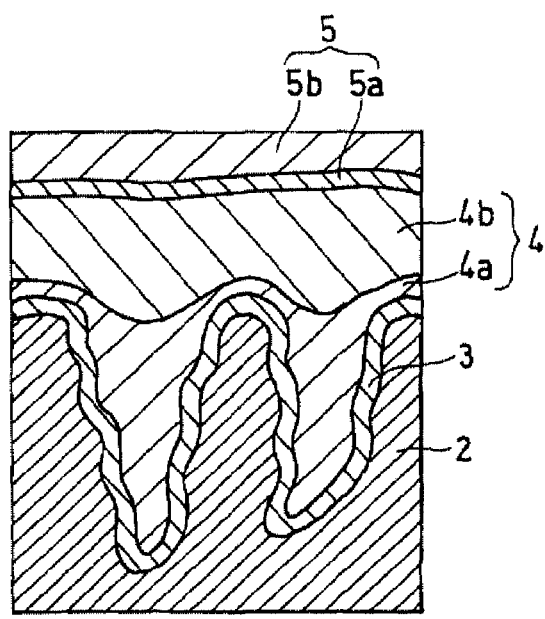
FIG. 2 is an enlarged view illustrating an area surrounded by a solid line α in FIG. 1.

FIG. 1 is a schematic sectional view illustrating an electrolytic capacitor according to one exemplary embodiment of the present disclosure. FIG. 2 is an enlarged view illustrating an area surrounded by a solid line α in FIG. 1.

Electrolytic capacitor 1 includes capacitor element 11, resin outer packing 12 that seals capacitor element 11, and anode terminal 13 and cathode terminal 14 that are exposed to the outside of resin outer packing 12. Capacitor element 11 includes anode body 2 having a foil-like or plate-like shape, dielectric layer 3 covering anode body 2, and cathode portion 15 covering dielectric layer 3. Anode terminal 13 is electrically connected to anode body 2, and cathode terminal 14 is electrically connected to cathode portion 15. Resin outer packing 12 has an almost rectangular parallelepiped outer shape, and therefore electrolytic capacitor 1 also has an almost rectangular parallelepiped outer shape.

Anode body 2 and cathode portion 15 are opposed to each other with dielectric layer 3 interposed between anode body 2 and cathode portion 15. Cathode portion 15 includes conductive polymer layer 4 covering dielectric layer 3 and cathode layer 5 covering conductive polymer layer 4. Cathode layer 5 shown in the drawings has a two-layer structure, and includes carbon layer 5a in contact with conductive polymer layer 4 and silver paste layer 5b covering a surface of carbon layer 5a.

Anode body 2 has an area on which insulating separation part 16 is formed so as to zonally cover a surface of anode body 2, the area being in an end of anode body 2 that protrudes from cathode portion 15 and being adjacent to cathode portion 15. Thus a contact between cathode portion 15 and anode body 2 is restricted at the area. The end of anode body 2 that protrudes from cathode portion 15 is electrically connected to first end 13a of anode terminal 13 by welding or the like. Meanwhile, cathode layer 5 formed as an outermost layer of cathode portion 15 is electrically connected to first end 14a of cathode terminal 14 via conductive adhesive material 17 (e.g., a mixture of a thermosetting resin and metal particles). Second end 13b of anode terminal 13 and second end 14b of cathode terminal 14 are drawn out from side surfaces of resin outer packing 12 which are different from each other, respectively. And second end 13b of anode terminal 13 and second end 14b of cathode terminal 14 each extend to one main flat surface (lower surface in FIG. 1) in an exposed state. The exposed parts of the terminals (anode terminal 13 and cathode terminal 14) on the flat surface are used for, for example, solder connections to a substrate (not shown in the drawings) on which electrolytic capacitor 1 is to be mounted.

Dielectric layer 3 is formed on a part of a surface of a conductive material constituting anode body 2. Specifically, dielectric layer 3 can be formed by anodizing the surface of the conductive material constituting anode body 2. Accordingly, dielectric layer 3 is formed along a surface (including an inner wall surface of pores or pits of an inner surface) of anode body 2 as shown in FIG. 2.

First conductive polymer layer 4a is formed so as to cover dielectric layer 3, and second conductive polymer layer 4b is formed so as to cover first conductive polymer layer 4a. However, a structure of the conductive polymer layer is not particularly limited as long as the electrolytic capacitor has the first conductive polymer layer and the second conductive polymer layer, and may be a multi-layer structure having two or more layers. First conductive polymer layer 4a does not necessarily cover whole (a whole surface of) dielectric layer 3 and is satisfactory as long as first conductive polymer layer 4a is formed so as to cover at least a part of dielectric layer 3. Similarly, second conductive polymer layer 4b does not necessarily cover whole (a whole surface of) first conductive polymer layer 4a and is satisfactory as long as second conductive polymer layer 4b is formed so as to cover at least a part of first conductive polymer layer 4a. In an example shown in the drawing, first conductive polymer layer 4a and second conductive polymer layer 4b are shown as conductive polymer layer 4. In general, a layer including a conductive polymer, such as first conductive polymer layer 4a, second conductive polymer layer 4b, and conductive polymer layer 4, may be referred to as a solid electrolyte layer.

Dielectric layer 3 is formed along the surface of anode body 2, and therefore irregularities are formed on a surface of dielectric layer 3 in accordance with a shape of the surface of anode body 2. First conductive polymer layer 4a is preferably formed so as to fill such irregularities of dielectric layer 3.

Hereinafter, a configuration of the electrolytic capacitor will be described in more detail.

(Anode Body)

A conductive material having a large surface area can be used as the anode body. Examples of the conductive material include a valve metal, an alloy including a valve metal, and a compound including a valve metal. These materials can be used alone or in combination of two or more materials. As the valve metal, there can be preferably used, for example, titanium, tantalum, aluminum and/or niobium. These metals are suitable as a constituent material of the anode body because oxides of these metals have a high dielectric constant. Examples of the anode body include one obtained by roughening a surface of a base material (e.g., a foil-like or plate-like base material) formed of a conductive material, and a molded body that is prepared from particles of a conductive material or a sintered body obtained by sintering the molded body.

(Dielectric Layer)

The dielectric layer is formed by anodizing, through an anodizing treatment or the like, a conductive material on the surface of the anode body, and therefore the dielectric layer includes an oxide of the conductive material (particularly, a valve metal). For example, when tantalum is used as the valve metal, the dielectric layer includes $Ta_2O_5$, and when aluminum is used as the valve metal, the dielectric layer includes $Al_2O_3$. The dielectric layer is not limited to these examples, and a layer is acceptable as the dielectric layer as long as the layer functions as a dielectric body. When the anode body is a foil-like or plate-like anode body, and a surface of the anode body is roughened, the dielectric layer is formed along an inner wall surface of pores or pits at a surface of anode body 2 as shown in FIG. 2.

(First Conductive Polymer Layer and Second Conductive Polymer Layer)

The first conductive polymer layer includes the first conductive polymer and the dopant, and the second conductive polymer layer includes the second conductive polymer and the dopant. In each layer, the dopant may be included in a state of being doped in the first conductive polymer or the second conductive polymer. The dopant may be included in each layer in a state of being bonded to the first conductive polymer or the second conductive polymer.

(First Conductive Polymer and Second Conductive Polymer)

As each of the first conductive polymer and the second conductive polymer, a publicly known polymer, e.g., a π-conjugated conductive polymer, used for an electrolytic capacitor, can be used. Examples of such a conductive polymer include polymers having, as a basic skeleton, for example, polypyrrole, polythiophene, polyfuran, polyaniline, polyacetylene, polyphenylene, polyphenylene vinylene, polyacene, and/or polythiophene vinylene.

Such a polymer includes a homopolymer, a copolymer of two or more kinds of monomers, and derivatives (e.g., a substitute having a substituent) of these polymers. For example, polythiophene includes poly(3,4-ethylenedioxythiophene) and the like. Such a conductive polymer has high conductivity and gives an excellent ESR characteristics. These conductive polymers may be used alone or in combination of two or more conductive polymers. A weight average molecular weight of the first conductive polymer and that of the second conductive polymer are not particularly limited, and ranges, for example, from 1,000 to 1,000,000, inclusive.

The first conductive polymer and the second conductive polymer can be obtained by, for example, polymerizing a raw material of the conductive polymer (a precursor of the conductive polymer). The conductive polymer that is bonded to or doped with the dopant can be obtained by polymerizing a raw material of the conductive polymer in the presence of the dopant. Examples of the precursor of the conductive polymer include a monomer that constitutes the conductive polymer and/or an oligomer in which some monomers are linked to each other. As a polymerization method, both chemical oxidation polymerization and electrolytic oxidation polymerization can be employed.

The electrolytic oxidation polymerization proceeds by, for example, applying, to a polymerization liquid containing a raw material of the conductive polymer, a constant current ranging from 0.05 mA/cm$^2$ to 10 mA/cm$^2$, or a constant voltage ranging from 0.5 V to 10 V. A catalyst may be added to the polymerization liquid in order to accelerate the polymerization. As the catalyst, there can be used, for example, ferrous sulfate and ferric sulfate. The polymerization liquid may further contain a dopant.

The chemical oxidation polymerization proceeds by mixing a raw material of the conductive polymer with an oxidant. As the oxidant used for the chemical oxidation polymerization, there is used, for example, a persulfate (e.g., ammonium persulfate, sodium persulfate, and potassium persulfate) or a metal sulfonate. At this time, ferrous sulfate and ferric sulfate may be used as a catalyst. The chemical oxidation polymerization may be performed in the presence of a dopant, as required.

For the polymerization, a solvent (first solvent) for dissolving or dispersing a raw material of the conductive polymer (and a dopant) may be used as required. Examples of the first solvent include water, a water-soluble organic solvent, and a mixture of water and a water-soluble organic solvent. The water-soluble organic solvent is not particularly limited, and examples of the water-soluble organic solvent include acetone, tetrahydrofuran, methanol, ethanol, isopropanol, and/or N-methyl-2-pyrrolidone. When the conductive polymer is synthesized with use of the first solvent, the conductive polymer can be obtained in a state of being dispersed in the first solvent. Then, it is preferred to remove, as required, impurities such as an unreacted monomer, an undoped or excessive dopant, a persulfate, and a catalyst by, for example, dialysis or an ion exchange method.

The first conductive polymer may be synthesized in advance before being attached to the anode body including the dielectric layer, and the second conductive polymer may be synthesized in advance before being attached to the first conductive polymer layer. In the case of the chemical oxidation polymerization, the polymerization of the first conductive polymer may be performed in the presence of the anode body including the dielectric layer. The polymerization of the second conductive polymer may be performed in the presence of the anode body having the first conductive polymer layer formed thereon.

(Dopant)

The first conductive polymer layer and the second conductive polymer layer each include a first polymer dopant having a sulfonation degree of $S_1$. At least one of the first conductive polymer layer and the second conductive polymer layer includes a second polymer dopant having a sulfonation degree of $S_2$. The sulfonation degree of $S_1$ of the first polymer dopant is lower than the sulfonation degree of $S_2$ of the second polymer dopant ($S_1 < S_2$). The term sulfonation degree of the polymer dopant in the present specification means a proportion (mol %) of a repeating unit having a sulfonate group (including a salt or ester of the sulfonate group) in whole repeating units constituting a molecule of the polymer dopant. The polymer dopant may have two or more sulfonate groups (including a salt or ester of the sulfonate group) per repeating unit; however, it preferably has one sulfonate group (including a salt or ester of the sulfonate group) per repeating unit.

Structures (or skeletons) of the first polymer dopant and the second polymer dopant are not particularly limited as long as the first polymer dopant and the second polymer dopant each have a sulfonate group, and the sulfonation degree satisfies a relation of $S_1 < S_2$. Examples of the first polymer dopant and the second polymer dopant include a homopolymer of a monomer having a sulfonate group (first monomer), a copolymer of the first monomer with another monomer (second monomer), a sulfonated phenolic resin (a sulfonated phenolic novolak resin, etc.), and the like. The homopolymer or the copolymer may be a condensation polymer (polyester or the like) obtained by using a condensation reaction, or may be a non-condensation polymer (vinyl polymer, diene polymer or the like) other than a condensation polymer.

The sulfonation degree of $S_1$ of the first polymer dopant is, for example, 55 mol % or less, and ranges preferably from 5 mol % to 55 mol %, inclusive, or from 5 mol % to 50 mol %, inclusive, further preferably from 10 mol % to 30 mol %, inclusive, or from 10 mol % to 25 mol %, inclusive. When the sulfonation degree of $S_1$ falls within such a range, the moisture resistance of the whole conductive polymer layer can be further improved.

The first conductive polymer layer and the second conductive polymer layer each may include a plurality of first polymer dopants having different sulfonation degrees and/or structures. When the plurality of first polymer dopants having different sulfonation degrees with each other are used, each of the plurality of first polymer dopants preferably has a sulfonation degree of $S_1$ falling within the above-mentioned range of $S_1$.

As the first polymer dopant, a copolymer of the first monomer with the second monomer is preferred. As the first polymer dopant, a non-condensation polymer including a vinyl monomer having a sulfonate group and/or a diene monomer having a sulfonate group as the first monomer as well as another copolymerizable monomer (second monomer) can be used. And, a condensation polymer, such as a polyester having a sulfonate group, is preferred from the viewpoint that the condensation polymer is relatively easily dispersed in a treatment liquid for forming the conductive polymer layer and easily permeated into the anode body. In addition, the other copolymerizable monomer used in the non-condensation polymer can be appropriately selected from copolymerizable monomers described later regarding the second polymer dopant.

Examples of the polyester having a sulfonate group include polyesters including, as the first monomer, a polycarboxylic acid (dicarboxylic acid or the like) having a sulfonate group and/or a polyol (diol or the like) having a sulfonate group, and, as the second monomer, a polycarboxylic acid (dicarboxylic acid or the like) and a polyol (diol or the like). As the first monomer, a polycarboxylic acid having a sulfonate group is preferably used. As the polycarboxylic acid having a sulfonate group, dicarboxylic acids (aromatic dicarboxylic acid and the like) having a sulfonate group, such as sulfonated phthalic acid, sulfonated isophthalic acid, and sulfonated terephthalic acid, are preferred. As the polycarboxylic acid as the second monomer, a polycarboxylic acid not having a sulfonate group is used, and dicarboxylic acids (aromatic dicarboxylic acid and the like), such as phthalic acid, isophthalic acid, and terephthalic acid, are preferred. As the polyol as the second monomer, a polyol not having a sulfonate group is used, and aliphatic diols ($C_{2-4}$ alkylene glycol and the like), such as ethylene glycol and propylene glycol, are preferred. The first monomer and the second monomer may each be used alone or in combination of two or more monomers. The sulfonation degree of $S_1$ of the first polymer dopant can be adjusted by adjusting a proportion of the first monomer.

The sulfonation degree of $S_2$ of the second polymer dopant is, for example, preferably 45 mol % or more (for example, ranges from 45 mol % to 100 mol %, inclusive), and may range from 50 mol % to 100 mol %, inclusive, or from 70 mol % to 100 mol %, inclusive. When the sulfonation degree of $S_2$ falls within such a range, dispersibility of the dopant (and the conductive polymer) in the conductive polymer layer is easily enhanced, and conductivity is easily further improved.

($S_2$–$S_1$) which is a difference between the sulfonation degree of $S_1$ and the sulfonation degree of $S_2$ is, for example, 25 mol % or more, and ranges preferably from 25 mol % to 90 mol %, inclusive, or from 30 mol % to 90 mol %, inclusive. When the difference ($S_2$–$S_1$) falls within such a range, it is easy to have a balance between high moisture resistance and at least one of high capacitance and low ESR.

The first conductive polymer layer (or the second conductive polymer layer) may include a plurality of second polymer dopants having different sulfonation degrees and/or structures. When the plurality of second polymer dopants having different sulfonation degrees with each other are used, each of the plurality of second polymer dopants preferably has a sulfonation degree falling within the above-mentioned range of $S_2$.

The second polymer dopant includes at least one selected from the group consisting of a polymer dopant A having a sulfonation degree of $S_{2a}$ and a polymer dopant B having a sulfonation degree of $S_2b$. Here, the sulfonation degree of $S_{2a}$ and the sulfonation degree of $S_{2b}$ satisfy a relation of $S_{2b}<S_{2a}$. The sulfonation degree of $S_{2a}$ is, for example, 90 mol % or more, and ranges preferably from 95 mol % to 100 mol %, inclusive. The sulfonation degree of $S_{2b}$ is, for example, 45 mol % or more and less than 90 mol %, and preferably 50 mol % or more and less than 90 mol % or ranges from 45 mol % or more to 85 mol % or less, inclusive. The first conductive polymer layer (or the second conductive polymer layer) may include one of or both of the polymer dopant A and the polymer dopant B.

As the second polymer dopant, non-condensation polymers including the first monomer are preferred, and among these polymers, a homopolymer or a copolymer of a non-condensation monomer having a sulfonate group (first monomer), and a copolymer of a non-condensation monomer having a sulfonate group (first monomer) with another copolymerizable monomer (second monomer) are preferred. Of these second polymer dopants, as the above polymer dopant A, a homopolymer or a copolymer of a non-condensation monomer having a sulfonate group, a sulfonated phenolic resin, and the like are preferred, and particularly, the former is preferred. As the above polymer dopant B, a copolymer of a non-condensation monomer having a sulfonate group with another copolymerizable monomer is preferred. The sulfonation degree of $S_2$ of the second polymer dopant can be adjusted by adjusting a proportion of the first monomer.

Examples of the non-condensation monomer as the first monomer include a vinyl monomer having a sulfonate group and a diene monomer having a sulfonate group. Examples of the vinyl monomer having a sulfonate group include aliphatic vinyl monomers having a sulfonate group, such as vinylsulfonic acid, allylsulfonic acid, and 2-acrylamido-2-methylprop anesulfonic acid, and aromatic vinyl monomers having a sulfonate group, such as styrene sulfonic acid. Examples of the diene monomer having a sulfonate group include isoprenesulfonic acid. One of these first monomers can be used alone, or two or more of these monomers can be used in combination. Among these first monomers, it is preferred to use at least an aromatic vinyl monomer having a sulfonate group. Particularly, as the polymeric dopant A, an aromatic vinyl polymer having a sulfonate group, for example, a homopolymer of an aromatic vinyl monomer having a sulfonate group and a copolymer of an aromatic vinyl monomer having a sulfonate group with another monomer having a sulfonate group (e.g., aliphatic vinyl monomer having a sulfonate group, and/or a diene monomer having a sulfonate group), are preferred.

As the other copolymerizable monomer (second monomer) to be copolymerized with the first monomer, a monomer not having an anionic group (vinyl monomer or the like) and the like can be used, but a monomer having an anionic group other than a sulfonate group (vinyl monomer or the like) is preferably used. As the polymer dopant B, a copolymer including a monomer unit having a sulfonate group (aromatic vinyl monomer unit having a sulfonate group or the like), and a monomer unit having an anionic group other than a sulfonate group (vinyl monomer unit or the like), is preferred. The anionic group includes, for example, at least one selected from the group consisting of a carboxyl group, a phosphate group, and a phosphonate group, and the carboxyl group and/or the phosphate group is preferred. Such a copolymer has high restorability of the dielectric layer and can also suppress the leakage current.

In the polymer dopant or a monomer constituting the polymer dopant, the anionic group such as a sulfonate group or a carboxyl group is not particularly limited as long as the anionic group can generate an anion in a dissociated state, and the anionic group may be a salt or ester of the above-mentioned anionic group.

The second polymer dopant is preferably included in any one of the first conductive polymer layer and the second conductive polymer layer. When the second polymer dopant is included in both of the first conductive polymer layer and the second conductive polymer layer, a composition of the second polymer dopant contained in the first conductive polymer layer is different from a composition of the second polymer dopant contained in the second conductive polymer layer.

The phrase "a composition of the second polymer dopant included in the first conductive polymer layer is different from a composition of the second polymer dopant included in the second conductive polymer layer" means not including a case where second polymer dopants in the layers are the same. For example, the first conductive polymer layer may include a polymer dopant A (or polymer dopant B), and the second conductive polymer layer may include a polymer dopant B (or polymer dopant A). Further, the first conductive polymer layer may include any one of a polymer dopant A and a polymer dopant B, and the second conductive polymer layer may include a polymer dopant A and a polymer dopant B. Further, a case where second polymer dopants included in the layers are different in composition includes a case where second polymer dopants included in the layers are different in sulfonation degree and/or structure. For example, the first conductive polymer layer may include a polymer dopant A (or polymer dopant B), and the second conductive polymer layer may include a polymer dopant A (or polymer dopant B) which is different in sulfonation degree and/or structure from the polymer dopant A of the first conductive polymer layer.

When the polymer dopant A is used as the second polymer dopant of the first conductive polymer layer, and the polymer dopant B is used as the second polymer dopant of the second conductive polymer layer, high capacitance and low ESR are more easily achieved in addition to further enhancing an effect of suppressing the leakage current. In such a case, when the sulfonation degree of $S_1$ of the first polymer dopant included in the first conductive polymer layer and the second conductive polymer layer is set to from 10 mol % to 30 mol %, inclusive, or from 10 mol % to 25 mol %, inclusive, the moisture resistance can also be further improved.

A weight average molecular weights of each of the first polymer dopant and the second polymer dopant ranges, for example, from 1,000 to 1,000,000, inclusive, preferably from 10,000 to 500,000, inclusive. Use of the polymer dopant having such a molecular weight further facilitates homogenization of the conductive polymer layer. In the first polymer dopant, the weight average molecular weight more preferably ranges from 5,000 to 80,000, inclusive. In the second polymer dopant, the weight average molecular weight more preferably ranges from 10,000 to 500,000, inclusive. A weight average molecular weight of a sulfonated phenolic resin of the second polymer dopant may range from 5,000 to 80,000, inclusive.

A content of the dopant included in the first conductive polymer layer ranges preferably from 10 parts by mass to 1,000 parts by mass, inclusive, more preferably from 50 parts by mass to 200 parts by mass, inclusive, with respect to 100 parts by mass of the first conductive polymer. A content of the dopant included in the second conductive polymer layer ranges preferably from 10 parts by mass to 1,000 parts by mass, inclusive, further preferably from 50 parts by mass to 200 parts by mass, inclusive, with respect to 100 parts by mass of the second conductive polymer. A total of the contents of the first polymer dopant and the second polymer dopant included in each layer preferably falls within the above-mentioned range.

When the first conductive polymer layer includes the second polymer dopant, a content of the second polymer dopant ranges, for example, from 10 parts by mass to 90 parts by mass, inclusive, preferably from 20 parts by mass to 70 parts by mass, inclusive, and further preferably from 40 parts by mass to 60 parts by mass, inclusive, with respect to 100 parts by mass of the first polymer dopant included in the first conductive polymer layer. When the second conductive polymer layer includes the second polymer dopant, a content of the second polymer dopant ranges, for example, from 10 parts by mass to 90 parts by mass, inclusive, preferably from 20 parts by mass to 70 parts by mass, inclusive, and further preferably from 40 parts by mass to 60 parts by mass, inclusive, with respect to 100 parts by mass of the first polymer dopant included in the second conductive polymer layer. When the content of the second polymer dopant in each layer falls within such a range, it is advantageous to reduce the ESR since resistance of each layer is easily decreased while securing high moisture resistance.

An average thickness of the second conductive polymer layer ranges, for example, from 5 µm to 100 µm, inclusive, preferably from 10 µm to 50 µm, inclusive. A ratio of the average thickness of the second conductive polymer layer to the average thickness of the first conductive polymer layer is, for example, 5 times or more, preferably 10 times or more. When the average thickness and the ratio of the average thickness fall within such a range, strength of the conductive polymer layer can be enhanced. As described above, the average thickness of the second conductive polymer layer is larger than the average thickness of the first conductive polymer layer, so that resistance tends to increase. Thus, use of the second polymer dopant for at least the second conductive polymer layer enables to effectively reduce the ESR.

Described in the above exemplary embodiment is a case where the capacitor element has a two-layered conductive polymer layer of the first conductive polymer layer and the second conductive polymer layer. However, the capacitor element may also have a three- or more layered conductive polymer layer. The first conductive polymer layer and the second conductive polymer layer may each be formed of one layer or may be formed of a plurality of layers.

Each of the first conductive polymer layer and the second conductive polymer layer may further include a publicly known additive, and/or a publicly known conductive material (e.g., a conductive inorganic material such as manganese dioxide; and/or a TCNQ complex salt) other than the conductive polymer, as required. A layer to enhance adhesion may be interposed between the dielectric layer and the conductive polymer layer or between the first conductive polymer layer and the second conductive polymer layer.

(Cathode Layer)

The carbon layer is satisfactory as long as the carbon layer has conductivity, and the carbon layer can be configured, for example, with use of a conductive carbon material such as graphite. For the silver paste layer, for example, there can be used a composition including a silver powder and a binder resin (e.g., an epoxy resin). The cathode layer is not limited to this configuration and is satisfactory as long as the cathode layer is configured to have a function of power collection. The anode terminal and the cathode terminal can be configured to include, for example, a metal such as copper or a copper alloy. As a material of the resin outer packing, there can be used, for example, an epoxy resin.

The electrolytic capacitor of the present disclosure is not limited to the electrolytic capacitor having the structure described above, and can be various electrolytic capacitors. Specifically, the present disclosure can also be applied to, for example, a wound electrolytic capacitor and an electrolytic capacitor including a metal powder sintered body as the anode body.

[Method for Producing Electrolytic Capacitor]

An electrolytic capacitor can be produced through following four steps. A first step is preparing an anode body. A second step is forming a dielectric layer on the anode body. A third step is treating the dielectric layer-formed anode body with a first treatment liquid containing a first conductive polymer and a dopant. And a fourth step is treating the anode body treated with the first treatment liquid with a second treatment liquid containing a second conductive polymer and a dopant. The method for producing an electrolytic capacitor may further include a step (fifth step) of forming a cathode layer. Hereinafter, the steps are described in more detail.

(First Step)

In the first step, an anode body is formed by a publicly known method according to a kind of the anode body. The anode body can be prepared by, for example, roughening a surface of a foil-like or plate-like base material formed of a conductive material. The roughening is satisfactory as long as irregularities are formed on the surface of the base material and may be performed, for example, by subjecting the surface of the base material to etching (e.g., electrolytic etching) or by depositing particles of the conductive material on the surface of the base material using a gas phase method such as vapor deposition.

(Second Step)

In the second step, a dielectric layer is formed on the anode body. The dielectric layer is formed by anodizing a surface of the anode body. The anodization can be performed by a publicly known method, for example, an anodizing treatment. The anodizing treatment can be performed by, for example, immersing the anode body in an anodizing liquid to impregnate, with the anodizing liquid, the surface (a more inside surface, i.e., an inner wall surface of pores or pits) of the anode body, and applying a voltage between the anode body as an anode and a cathode immersed in the anodizing liquid. As the anodizing liquid, it is preferred to use, for example, an aqueous solution of phosphoric acid, an aqueous solution of ammonium phosphate, or an aqueous solution of ammonium adipate.

(Third Step)

In the third step, a first conductive polymer layer is formed with use of a first treatment liquid containing a first conductive polymer and a dopant. As the dopant, a dopant which is described as the dopant included in the above first conductive polymer layer is contained in the first treatment solution.

In the third step, for example, the dielectric layer-formed anode body is immersed in the first treatment liquid or the first treatment liquid is added dropwise to the dielectric layer-formed anode body. The first treatment liquid is impregnated by the immersion or the dropwise addition, into the surface (a more inside surface, i.e., an inner wall surface of pores or pits on which the dielectric layer has been formed) of the dielectric layer-formed anode body. After impregnating with the first treatment liquid, the anode body may be dried as required. During the drying, the anode body may be heated as required. The third step allows the conductive polymer and the dopant to adhere to the surface of the dielectric layer-formed anode body, thus forming the first conductive polymer layer.

In a preferred exemplary embodiment, a conductive polymer dispersion is used as the first treatment liquid. The conductive polymer dispersion contains the first conductive polymer, the dopant, and a solvent (second solvent). By using such a conductive polymer dispersion, the first conductive polymer layer describe above can be easily formed and the first conductive polymer layer stable in quality can be obtained.

Examples of the second solvent include water, an organic solvent, and a mixture of water and an organic solvent. Examples of the organic solvent include aliphatic alcohols having 1 to 5 carbon atoms (e.g., aliphatic monools such as methanol, ethanol, propanol, and 1-butanol; and aliphatic polyols such as ethylene glycol and glycerol); aliphatic ketones such as acetone; nitriles such as acetonitrile and benzonitrile; amides such as N,N-dimethylformamide; and/or sulfoxides such as dimethyl sulfoxide. As the second solvent, one solvent may be used alone, or two or more solvents may be used in combination.

The first conductive polymer and/or the dopant dispersed in the conductive polymer dispersion is preferably particles (or a powder). An average particle size of the particles dispersed in the dispersion preferably ranges from 5 nm to 500 nm, inclusive. The average particle size can be obtained, for example, from a particle size distribution measured by a dynamic light scattering method.

The conductive polymer dispersion can be obtained by dispersing the first conductive polymer and the dopant in a solvent. Alternatively, as the conductive polymer dispersion, there may be used a dispersion (dispersion a) obtained by removing impurities from a polymerization liquid of the first conductive polymer and then mixing the dopant with the polymerization liquid, or a dispersion (dispersion b) obtained by removing impurities from a polymerization liquid formed through polymerization of the first conductive polymer in the presence of the dopant. In using such a dispersion, those exemplified for the second solvent may be used as a solvent (first solvent) during the polymerization, or the second solvent may be added when impurities are removed. The second solvent may further be added to the dispersions a and b.

The conductive polymer dispersion may contain a publicly known additive as required.

(Fourth Step)

The fourth step can be performed in the same manner as in the third step or by a procedure similar to that of the third step except that the anode body treated with the first treatment liquid is used, and a second treatment liquid containing the second conductive polymer and the dopant is used in place of the first treatment liquid. As the second treatment liquid, it is possible to use a treatment liquid prepared in the same manner as in the first treatment liquid except that the second conductive polymer is used in place of the first conductive polymer and a dopant described in the second conductive polymer layer is used as the dopant.

(Fifth Step)

In the fifth step, a cathode layer is formed by sequentially stacking a carbon layer and a silver paste layer on the surface (preferably of the conductive polymer layer formed) of the anode body obtained in the fourth step.

EXAMPLES

Hereinafter, the present disclosure is specifically described with reference to Examples and Comparative Examples. The present disclosure, however, is not limited to the examples below.

Example 1

Electrolytic capacitor 1 shown in FIG. 1 was produced in the manner described below, and characteristics of the electrolytic capacitor were evaluated.

(1) Step of Preparing Anode Body 2 (First Step)

Both surfaces of an aluminum foil (thickness: 100 μm) as a base material were roughened by etching to produce anode body 2.

(2) Step of Forming Dielectric Layer 3 (Second Step)

A part on one end side of anode body 2 (a part from a separation part to the one end) was immersed in an anodizing liquid, and a 70 V DC voltage was applied for 20 minutes to form dielectric layer 3 including aluminum oxide.

(3) Step of Forming First Conductive Polymer Layer 4a (Third Step)

A 3,4-ethylenedioxythiophene monomer was added under stirring to an aqueous solution containing polystyrene sulfonic acid (sulfonation degree: 100 mol %) and polyester having a sulfonate group (sulfonation degree: 20 mol %) in the mass ratio of 100:100, and then oxidants (iron(III) sulfate and sodium persulfate) were added to the resulting mixture to carry out chemical oxidation polymerization. The resulting polymerization liquid was subjected to filtration by ion-exchange equipment to remove impurities. Thus, a solution was obtained which contained poly(3,4-ethylenedioxythiophene) (PEDOT) as a first conductive polymer, polyester having a sulfonate group as a first polymer dopant, and polystyrene sulfonic acid as a second polymer dopant.

Pure water was added to the obtained solution, and the resulting mixture was homogenized by a high-pressure homogenizer and was further subjected to filtration by a filter to prepare a first treatment liquid in a state of a dispersion liquid.

Anode body 2, on which dielectric layer 3 obtained in the above step (2) was formed, was immersed in the first treatment liquid, then taken out from the first treatment liquid, and further dried at 120° C. for a period ranging from 10 minutes to 30 minutes. The immersion in the first treatment liquid and the drying were repeated again, so that first conductive polymer layer 4a was formed so as to cover a surface of dielectric layer 3. An average thickness of first conductive polymer layer 4a measured by a scanning electron microscope (SEM) was about 1 μm.

(4) Step of Forming Second Conductive Polymer Layer 4b (Fourth Step)

A 3,4-ethylenedioxythiophene monomer was added under stirring to an aqueous solution of polyester having a sulfonate group (sulfonation degree: 20 mol %), and then oxidants (iron(III) sulfate and sodium persulfate) were added to the resulting mixture to carry out chemical oxidation polymerization. The resulting polymerization liquid was subjected to filtration by ion-exchange equipment to remove impurities. Thus, a solution was obtained which contained poly(3,4-ethylenedioxythiophene) (PEDOT) as a first conductive polymer, and polyester having a sulfonate group as a first polymer dopant.

Pure water was added to the obtained solution, and the resulting mixture was homogenized by a high-pressure homogenizer and was further subjected to filtration by a filter to prepare a second treatment liquid in a state of a dispersion liquid.

Anode body 2 treated in the above step (3) was immersed in the second treatment liquid, was taken out from the second treatment liquid, and further dried at 120° C. for a period ranging from 10 minutes to 30 minutes. The immersion in the second treatment liquid and the drying were alternately repeated twice, so that second conductive polymer layer 4b was formed so as to cover a surface of first conductive polymer layer 4a. An average thickness of second conductive polymer layer 4b was measured in the same manner as in first conductive polymer layer 4a, and consequently the average thickness was about 30 μm.

Thus, first conductive polymer layer 4a and second conductive polymer layer 4b were formed so as to cover the surface of dielectric layer 3.

(5) Step of Forming Cathode Layer 5 (Fifth Step)

Anode body 2 obtained in the above (4) was immersed in a dispersion liquid in which graphite particles were dispersed in water, was taken out from the dispersion liquid, and was dried to form carbon layer 5a on at least a surface of second conductive polymer layer 4b. The drying was carried out at a temperature ranging from 130° C. to 180° C. for a period ranging from 10 minutes to 30 minutes.

Then, a silver paste containing silver particles and a binder resin (epoxy resin) was applied onto a surface of carbon layer 5a, and the layer coated with the silver paste was heated at a temperature ranging from 150° C. to 200° C. for a period ranging from 10 minutes to 60 minutes to cure the binder resin, so that silver paste layer 5b was formed. Thus, cathode layer 5 composed of carbon layer 5a and silver paste layer 5b was formed.

As described above, capacitor element 11 was produced.

(6) Assembling of Electrolytic Capacitor

Cathode layer 5 of capacitor element 11, obtained in the above step (5), was joined with one end (first end) 14a of cathode terminal 14 by conductive adhesive 17. The other end of anode body 2, which protruded from capacitor element 11, was joined with one end (first end) 13a of anode terminal 13 by laser welding. Next, resin outer packing 12 formed of an insulating resin was formed around capacitor element 11 by a transfer molding method. Then, the other end (second end) 13b of anode terminal 13 and the other end (second end) 14b of cathode terminal 14 were in a state of being drawn out from resin outer packing 12. Thus, electrolytic capacitor 1 (A1) was completed. In the same manner as described above, a total of 500 electrolytic capacitors 1 were produced.

(7) Evaluation

The following evaluations were performed using an electrolytic capacitor. The electrostatic capacities, the ESR values and the moisture resistances were measured for each randomly selected 120 electrolytic capacitors, and average values for the electrostatic capacities, the ESR values and the moisture resistances were calculated.

(a) Electrostatic Capacity and ESR

An electrostatic capacity (initial electrostatic capacity) (μF) at a frequency of 120 Hz was measured for the electrolytic capacitor using an LCR meter for four-terminal measurement. An ESR value (initial ESR value) (mΩ) at a frequency of 100 kHz was measured for the electrolytic capacitor using an LCR meter for 4-terminal measurement.

(b) Leakage Current (LC)

A voltage of 10 V was applied between anode body 2 and cathode layer 5 of the electrolytic capacitor and leakage current was measured after 40 seconds of the application. Then, an electrolytic capacitor having a leakage current amount exceeding 100 μA was determined to be defective, and an LC defective rate (%) was calculated in each of the examples and comparative examples to take the rate as a reference index of the leakage current.

(c) Moisture Resistance

The electrolytic capacitor was maintained for 500 hours under an atmosphere of 60° C. and 90% RH. Then, in the same manner as in the above (a), the ESR values were measured and an average value of the ESR values was determined. A difference between the average value and the initial ESR value was determined, and a ratio (%) of the difference to the initial ESR was taken as a reference index of the moisture resistance.

Example 2

In the third step of Example 1, a first treatment liquid of this example was prepared by the following procedure. A 3,4-ethylenedioxythiophene monomer was added under stirring to an aqueous solution of polyester having a sulfonate group (sulfonation degree: 20 mol %), and then oxidants (iron(III) sulfate and sodium persulfate) were added to the resulting mixture to carry out chemical oxidation polymerization. The resulting polymerization liquid was subjected to filtration by ion-exchange equipment to remove impurities. Thus, a solution was obtained which contained poly(3,4-ethylenedioxythiophene) (PEDOT) as a first conductive polymer, and polyester having a sulfonate group as a first polymer dopant. Pure water was added to the obtained solution, and the resulting mixture was homogenized by a high-pressure homogenizer and was further subjected to filtration by a filter to prepare a first treatment liquid in a state of a dispersion liquid.

In the fourth step of Example 1, a second treatment liquid of this example was prepared by the following procedure. A 3,4-ethylenedioxythiophene monomer was added under stirring to an aqueous solution containing acrylic acid-modified polystyrene sulfonic acid (sulfonation degree: 80 mol %) and polyester having a sulfonate group (sulfonation degree: 20 mol %) in the mass ratio of 100:100, and then oxidants (iron(III) sulfate and sodium persulfate) were added to the resulting mixture to carry out chemical oxidation polymerization. The resulting polymerization liquid was subjected to filtration by ion-exchange equipment to remove impurities. Thus, a solution was obtained which contained poly(3,4-ethylenedioxythiophene) (PEDOT) as a first conductive polymer, polyester having a sulfonate group as a first polymer dopant, and acrylic acid-modified polystyrene sulfonic acid as a second polymer dopant. Pure water was added to the obtained solution, and the resulting mixture was homogenized by a high-pressure homogenizer and was further subjected to filtration by a filter to prepare a second treatment liquid in a state of a dispersion liquid.

A capacitor element and an electrolytic capacitor were produced in the same manner as in Example 1 except for using the first treatment liquid and the second treatment liquid which are obtained by the above procedures, and the electrolytic capacitor was evaluated. Acrylic acid-modified polystyrene sulfonic acid as the second polymer dopant was synthesized by the following procedure.

1 L of pure water was poured to a 2-L separable flask equipped with a stirrer, and then sodium styrenesulfonate as a first monomer and an acrylic acid as a second monomer were added to the flask so that a uniform monomer solution was obtained. A molar ratio between the first monomer and the second monomer (=first monomer unit second monomer unit) was set to 80:20.

0.5 g of ammonium persulfate as an oxidant was further added to the monomer solution, and then a polymerization reaction between the first monomer and the second monomer was allowed to progress over 8 hours, so that a copolymer was obtained. Then, an operation was repeated that included adding pure water and an ion-exchange resin to the copolymer, stirring the resulting mixture, and filtrating the mixture, to remove impurities.

Example 3

In the fourth step of Example 2, a second treatment liquid of this example was prepared by the following procedure. A 3,4-ethylenedioxythiophene monomer was added under stirring to an aqueous solution containing polystyrene sulfonic acid (sulfonation degree: 100 mol %) and polyester having a sulfonate group (sulfonation degree: 20 mol %) in the mass ratio of 100:100, and then oxidants (iron(III) sulfate and sodium persulfate) were added to the resulting mixture to carry out chemical oxidation polymerization. The resulting polymerization liquid was subjected to filtration by ion-exchange equipment to remove impurities. Thus, a solution was obtained which contained poly(3,4-ethylenedioxythiophene) (PEDOT) as a first conductive polymer, polyester having a sulfonate group as a first polymer dopant, and polystyrene sulfonic acid as a second polymer dopant. Pure water was added to the obtained solution, and the resulting mixture was homogenized by a high-pressure homogenizer and was further subjected to filtration by a filter to prepare a second treatment liquid in a state of a dispersion liquid.

A capacitor element and an electrolytic capacitor were produced in the same manner as in Example 2 except for using the second treatment liquid which is obtained by the above procedure, and the electrolytic capacitor was evaluated.

Example 4

A first treatment liquid in a state of a dispersion liquid was prepared in the same manner as in Example 1 except for using acrylic acid-modified polystyrene sulfonic acid in place of the polystyrene sulfonic acid in the third step of Example 1. As the acrylic acid-modified polystyrene sulfonic acid, one synthesized in the same manner as in Example 2 was used. A capacitor element and an electrolytic capacitor were produced in the same manner as in Example 1 except for using the first treatment liquid thus obtained, and the electrolytic capacitor was evaluated.

Example 5

A capacitor element and an electrolytic capacitor were produced in the same manner as in Example 1 except for using, as the second treatment liquid, a second treatment liquid prepared in the same manner as in Example 2, and the electrolytic capacitor was evaluated.

Example 6

A capacitor element and an electrolytic capacitor were produced in the same manner as in Example 1 except for using a first treatment liquid prepared in the same manner as in Example 4 and a second treatment liquid prepared in the same manner as in Example 3, and the electrolytic capacitor was evaluated.

Example 7

A first treatment liquid was prepared in the same manner as in Example 1 except for using polyester having a sulfonate group (sulfonation degree: 10 mol %) as the first polymer dopant. Further, a second treatment liquid was prepared in the same manner as in Example 2 except for using polyester having a sulfonate group (sulfonation degree: 10 mol %) as the first polymer dopant. A capacitor element and an electrolytic capacitor were produced in the same manner as in Example 1 except for using the first treatment liquid and the second treatment liquid thus prepared, and the electrolytic capacitor was evaluated.

Example 8

A first treatment liquid was prepared in the same manner as in Example 1 except for using polyester having a sulfonate group (sulfonation degree: 30 mol %) as the first polymer dopant. Further, a second treatment liquid was prepared in the same manner as in Example 2 except for using polyester having a sulfonate group (sulfonation degree: 30 mol %) as the first polymer dopant. A capacitor element and an electrolytic capacitor were produced in the same manner as in Example 1 except for using the first treatment liquid and the second treatment liquid thus prepared, and the electrolytic capacitor was evaluated.

Example 9

A first treatment liquid was prepared in the same manner as in Example 1 except for using polyester having a sulfonate group (sulfonation degree: 50 mol %) as the first polymer dopant. Further, a second treatment liquid was prepared in the same manner as in Example 2 except for using polyester having a sulfonate group (sulfonation degree: 50 mol %) as the first polymer dopant. A capacitor element and an electrolytic capacitor were produced in the same manner as in Example 1 except for using the first treatment liquid and the second treatment liquid thus prepared, and the electrolytic capacitor was evaluated.

Example 10

A second polymer dopant (sulfonation degree: 50 mol %) was synthesized in the same manner as in Example 2 except that a vinyl monomer represented by the following formula (1) and having a phosphate group was used as the second monomer in place of acrylic acid, and a molar ratio between the first monomer and the second monomer (=first monomer unit:second monomer unit) was changed to 50:50. A second treatment liquid was prepared in the same manner as in Example 2 except for using the resulting second polymer dopant.

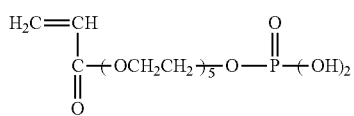

A capacitor element and an electrolytic capacitor were produced in the same manner as in Example 5 except for using the prepared second treatment liquid, and the electrolytic capacitor was evaluated.

Example 11

A second polymer dopant (sulfonation degree: 50 mol %) was synthesized in the same manner as in Example 2 except that a vinyl monomer represented by the following formula (2) and having a carboxyl group was used as the second monomer in place of acrylic acid, and a molar ratio between the first monomer and the second monomer (=first monomer unit:second monomer unit) was changed to 50:50. A second treatment liquid was prepared in the same manner as in Example 2 except for using the resulting second polymer dopant. A capacitor element and an electrolytic capacitor were produced in the same manner as in Example 5 except for using the prepared second treatment liquid, and the electrolytic capacitor was evaluated.

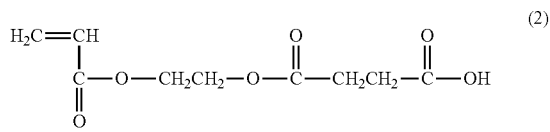

Comparative Example 1

In the third step of Example 1, the immersion in the first treatment liquid and the drying were repeated five times to form first conductive polymer layer 4a. An average thickness of first conductive polymer layer 4a was about 31 μm. A capacitor element and an electrolytic capacitor were produced in the same manner as in Example 1 except for not performing the fourth step, and the electrolytic capacitor was evaluated.

Comparative Example 2

In the third step of Example 1, a first treatment liquid of this comparative example was prepared by the following procedure. A 3,4-ethylenedioxythiophene monomer was added under stirring to an aqueous solution of polystyrene sulfonic acid (sulfonation degree: 100 mol %), and then oxidants (iron(III) sulfate and sodium persulfate) were added to the resulting mixture to carry out chemical oxidation polymerization. The resulting polymerization liquid was subjected to filtration by ion-exchange equipment to remove impurities. Thus, a solution was obtained which contained poly(3,4-ethylenedioxythiophene) (PEDOT) as a first conductive polymer, and polystyrene sulfonic acid as a second polymer dopant. Pure water was added to the obtained solution, and the resulting mixture was homogenized by a high-pressure homogenizer and was further subjected to filtration by a filter to prepare a first treatment liquid in a state of a dispersion liquid.

Using the first treatment liquid which is prepared by the above procedure, in the third step of Example 1, the immersion in the first treatment liquid and the drying were repeated five times to form first conductive polymer layer 4a. An average thickness of first conductive polymer layer 4a was about 31 μm. A capacitor element and an electrolytic capacitor were produced in the same manner as in Example 1 except for not performing the fourth step, and the electrolytic capacitor was evaluated.

Comparative Example 3

A capacitor element and an electrolytic capacitor were produced in the same manner as in Comparative Example 1 except for using a first treatment liquid prepared in the same manner as in Example 2, and the electrolytic capacitor was evaluated.

Comparative Example 4

A first treatment liquid was prepared in the same manner as in Comparative Example 2 except for using a second polymer dopant synthesized in the same manner as in Example 11. A capacitor element and an electrolytic capacitor were produced in the same manner as in Comparative Example 1 except for using the prepared first treatment liquid, and the electrolytic capacitor was evaluated.

Comparative Example 5

A capacitor element and an electrolytic capacitor were produced in the same manner as in Example 2 except for using a first treatment liquid prepared in the same manner as in Comparative Example 2, and the electrolytic capacitor was evaluated.

Comparative Example 6

A capacitor element and an electrolytic capacitor were produced in the same manner as in Example 3 except for using a first treatment liquid prepared in the same manner as in Comparative Example 2, and the electrolytic capacitor was evaluated.

Table 1 shows evaluation results of Examples 1 to 11 and Comparative Examples 1 to 6. A1 to A11 in Table 1 indicate electrolytic capacitors of Examples 1 to 11, respectively, and B1 to B6 indicate electrolytic capacitors of Comparative Examples 1 to 6, respectively.

TABLE 1

|  | Electrostatic Capacity (μF) | ESR (mΩ) | Leakage Current (%) | Moisture Resistance (%) |
| --- | --- | --- | --- | --- |
| A1 | 3.2 | 41 | 0.2 | 32 |
| A2 | 2.7 | 50 | 0.3 | 43 |
| A3 | 2.7 | 47 | 0.2 | 40 |
| A4 | 2.9 | 53 | 0.3 | 35 |
| A5 | 3.2 | 39 | 0.1 | 35 |
| A7 | 3.0 | 42 | 0.1 | 28 |
| A8 | 3.2 | 37 | 0.1 | 41 |
| A9 | 3.2 | 36 | 0.1 | 47 |
| A10 | 3.2 | 41 | 0.1 | 33 |
| A11 | 3.2 | 39 | 0.1 | 37 |
| B1 | 3.2 | 43 | 25.0 | 55 |
| B2 | 3.2 | 39 | 32.0 | 670 |
| B3 | 2.2 | 160 | 15.0 | 40 |
| B4 | 2.8 | 45 | 20.0 | 450 |
| B5 | 3.2 | 55 | 0.3 | 120 |
| B6 | 3.2 | 42 | 0.1 | 135 |

As shown in Table 1, in Examples, excellent moisture resistance was achieved. In Examples, a high capacitance could be secured, the ESR was reduced, and the leakage current was suppressed. On the other hand, in Comparative Examples, the moisture resistance was low, and particularly in Comparative Examples 2, and 4 to 6, the moisture resistance was extremely low. In Comparative Examples 1 to 4, the leakage current was remarkably high. In Comparative Example 3, the capacitance was low, and the ESR was high.

The electrolytic capacitor according to the exemplary embodiment of the present disclosure can be used for various uses in which the improvement of moisture resistance is required.

What is claimed is:
1. An electrolytic capacitor comprising:
an anode body,
a dielectric layer formed on the anode body,
a first conductive polymer layer covering at least a part of the dielectric layer and including a first conductive polymer, and
a second conductive polymer layer covering at least a part of the first conductive polymer layer and including a second conductive polymer, wherein:
the first conductive polymer layer and the second conductive polymer layer each further include a first polymer dopant having a sulfonation degree of $S_1$,
at least one of the first conductive polymer layer and the second conductive polymer layer further includes a second polymer dopant having a sulfonation degree of $S_2$, and
the sulfonation degree of $S_1$ and the sulfonation degree of $S_2$ satisfy a relation of $S_1 < S_2$,
the sulfonation degree being a proportion (mol %) of a repeating unit having a sulfonate group in whole repeating units constituting a molecule of the polymer dopant.

2. The electrolytic capacitor according to claim 1, wherein:
the sulfonation degree of $S_1$ ranges from 5 mol % to 55 mol %, inclusive, and
the sulfonation degree of $S_2$ is 45 mol % or more.

3. The electrolytic capacitor according to claim 2, wherein $(S_2 - S_1)$ which is a difference between the sulfonation degree of $S_1$ and the sulfonation degree of $S_2$ is 25 mol % or more.

4. The electrolytic capacitor according to claim 1, wherein the first polymer dopant is a polyester having a sulfonate group.

5. The electrolytic capacitor according to claim 1, wherein:
the second polymer dopant includes a polymer dopant A having a sulfonation degree of $S_{2a}$ and a polymer dopant B having a sulfonation degree of $S_{2b}$, and
the sulfonation degree of $S_{2a}$ and the sulfonation degree of $S_{2b}$ satisfy a relation of $S_{2b} < S_{2a}$.

6. The electrolytic capacitor according to claim 5, wherein:
the sulfonation degree of $S_{2a}$ is 90 mol % or more, and
the sulfonation degree of $S_{2b}$ is 45 mol % or more and less than 90 mol %.

7. The electrolytic capacitor according to claim 5, wherein:
the polymer dopant A is an aromatic vinyl polymer having a sulfonate group, and
the polymer dopant B is a copolymer including a monomer unit having a sulfonate group and a monomer unit having an anionic group other than a sulfonate group.

8. The electrolytic capacitor according to claim 7, wherein the anionic group is at least one anionic group selected from the group consisting of a carboxyl group, a phosphate group, and a phosphonate group.

9. The electrolytic capacitor according to claim 1, wherein a ratio of the average thickness of the second conductive polymer layer to the average thickness of the first conductive polymer layer is 5 times or more.

10. The electrolytic capacitor according to claim 9, wherein an average thickness of the second conductive polymer layer ranges 5 μm to 100 μm.

11. The electrolytic capacitor according to claim 1, wherein $(S_2 - S_1)$ which is a difference between the sulfonation degree of $S_1$ and the sulfonation degree of $S_2$ is 25 mol % or more.

12. The electrolytic capacitor according to claim 11, wherein the first polymer dopant is a polyester having a sulfonate group.

13. The electrolytic capacitor according to claim 11, wherein:

the second polymer dopant includes a polymer dopant A having a sulfonation degree of $S_{2a}$ and a polymer dopant B having a sulfonation degree of $S_{2b}$, and the sulfonation degree of $S_{2a}$ and the sulfonation degree of $S_{2b}$ satisfy a relation of $S_{2b}<S_{2a}$.

14. An electrolytic capacitor comprising:
an anode body,
a dielectric layer formed on the anode body,
a first conductive polymer layer covering at least a part of the dielectric layer and including a first conductive polymer, and
a second conductive polymer layer covering at least a part of the first conductive polymer layer and including a second conductive polymer,
wherein:
the first conductive polymer layer and the second conductive polymer layer each further include a first polymer dopant having a sulfonation degree of $S_1$,
the first conductive polymer layer and the second conductive polymer layer each further include a second polymer dopant having a sulfonation degree of $S_2$,
the sulfonation degree of $S_1$ and the sulfonation degree of $S_2$ satisfy a relation of $S_1<S_2$, and
a composition of the second polymer dopant included in the first conductive polymer layer is different from a composition of the second polymer dopant included in the second conductive polymer layer.

15. The electrolytic capacitor according to claim 14, wherein:
the sulfonation degree of $S_1$ ranges from 5 mol % to 55 mol %, inclusive, and
the sulfonation degree of $S_2$ is 45 mol % or more.

16. The electrolytic capacitor according to claim 15, wherein ($S_2-S_1$) which is a difference between the sulfonation degree of $S_1$ and the sulfonation degree of $S_2$ is 25 mol % or more.

17. The electrolytic capacitor according to claim 14, wherein the first polymer dopant is a polyester having a sulfonate group.

18. The electrolytic capacitor according to claim 14, wherein:
the second polymer dopant includes a polymer dopant A having a sulfonation degree of $S_{2a}$ and a polymer dopant B having a sulfonation degree of $S_{2b}$, and
the sulfonation degree of $S_{2a}$ and the sulfonation degree of $S_{2b}$ satisfy a relation of $S_{2b}<S_{2a}$.

19. The electrolytic capacitor according to claim 18, wherein:
the sulfonation degree of $S_{2a}$ is 90 mol % or more, and
the sulfonation degree of $S_{2b}$ is 45 mol % or more and less than 90 mol %.

20. The electrolytic capacitor according to claim 18, wherein:
the polymer dopant A is an aromatic vinyl polymer having a sulfonate group, and
the polymer dopant B is a copolymer including a monomer unit having a sulfonate group and a monomer unit having an anionic group other than a sulfonate group.

21. The electrolytic capacitor according to claim 20, wherein the anionic group is at least one anionic group selected from the group consisting of a carboxyl group, a phosphate group, and a phosphonate group.

22. The electrolytic capacitor according to claim 14, wherein
a ratio of the average thickness of the second conductive polymer layer to the average thickness of the first conductive polymer layer is 5 times or more.

23. The electrolytic capacitor according to claim 22, wherein
an average thickness of the second conductive polymer layer ranges 5 µm to 100 µm.

24. An electrolytic capacitor comprising:
an anode body,
a dielectric layer formed on the anode body, and
a conductive polymer layer covering at least a part of the dielectric layer and including a conductive polymer
wherein:
the conductive polymer includes a first polymer dopant having a sulfonation degree of $S_1$ and a second polymer dopant having a sulfonation degree of $S_2$, and
the sulfonation degree of $S_1$ and the sulfonation degree of $S_2$ satisfy a relation of $S_1<S_2$,
the sulfonation degree being a proportion (mol %) of a repeating unit having a sulfonate group in whole repeating units constituting a molecule of the polymer dopant.

25. The electrolytic capacitor according to claim 24, wherein:
the sulfonation degree of $S_1$ ranges from 5 mol % to 55 mol %, inclusive, and
the sulfonation degree of $S_2$ is 45 mol % or more.

26. The electrolytic capacitor according to claim 24, wherein:
($S_2-S_1$) which is a difference between the sulfonation degree of $S_1$ and the sulfonation degree of $S_2$ is 25 mol % or more.

27. An electrolytic capacitor comprising:
an anode body,
a dielectric layer formed on the anode body, and
a conductive polymer layer covering at least a part of the dielectric layer
wherein:
the conductive polymer layer includes a conductive polymer and a polyester having a sulfonate group,
the sulfonation degree of the polyester $S_1$ ranges from 5 mol % to 55 mol %,
the sulfonation degree being a proportion (mol %) of a repeating unit having a sulfonate group in whole repeating units constituting a molecule of the polymer dopant.

28. The electrolytic capacitor according to claim 27, wherein:
a weight average molecular weight of the polyester ranges from 1,000 to 1,000,000.

* * * * *